INVENTOR
W. F. BOLDT
BY
ATTORNEY

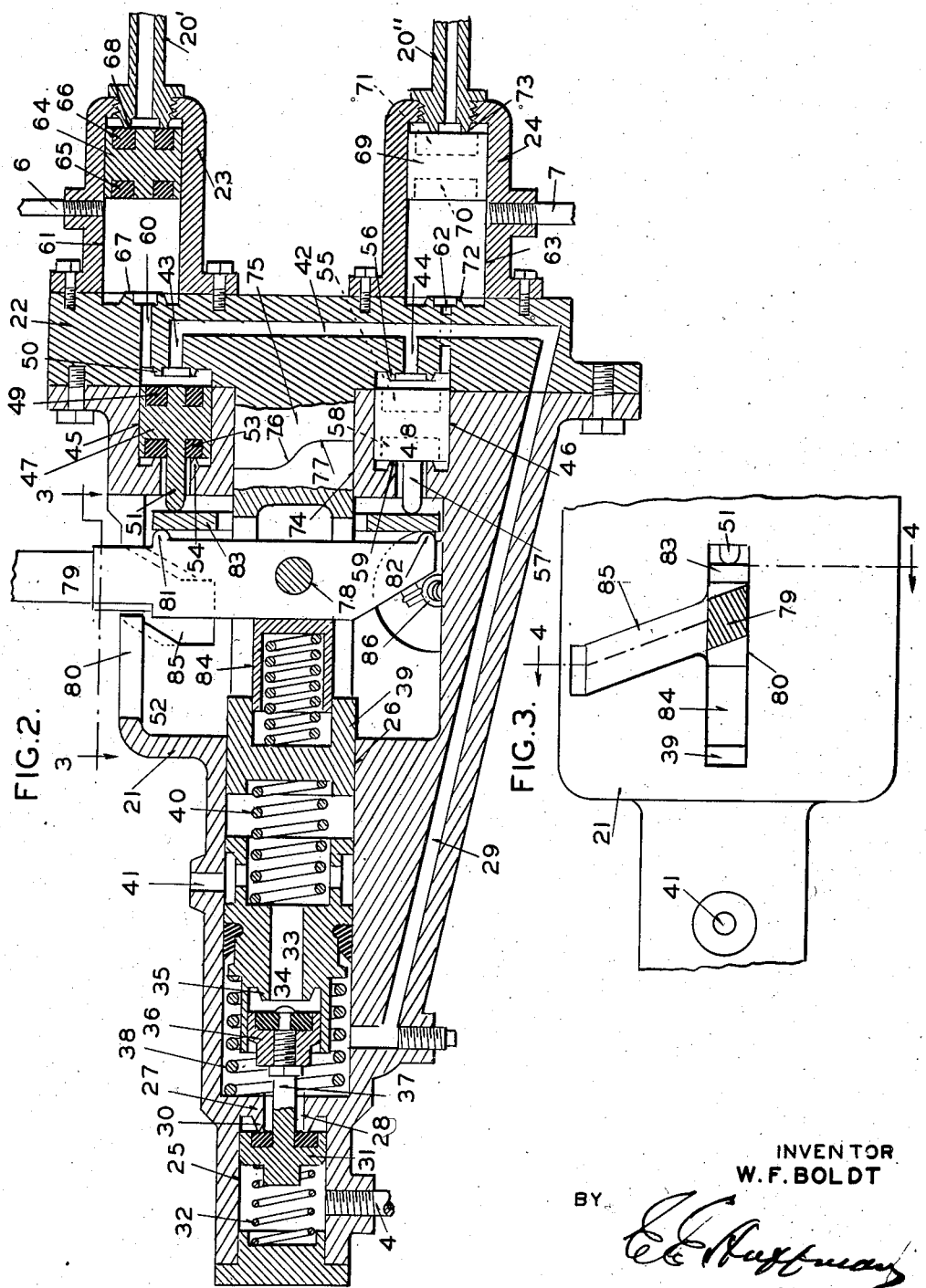

Patented Jan. 16, 1945

2,367,194

UNITED STATES PATENT OFFICE 2,367,194

FLUID PRESSURE ACTUATING SYSTEM

Werner F. Boldt, Clayton, Mo., assignor to Wagner Electric Corporation, St. Louis, Mo., a corporation of Delaware Application November 6, 1942, Serial No. 464,745

18 Claims. (Cl. 60—97)

My invention relates to fluid pressure actuating systems and more particularly to one for so permitting actuation of the brakes of a vehicle that said brakes can be employed in assisting vehicle steering.

One of the objects of my invention is to provide a fluid pressure actuating system for vehicle brakes in which is embodied improved valve means controlled by a single lever and permitting selective actuation of certain brakes by movement of the lever in opposite directions from a central inoperative position or simultaneous actuation of the brakes by movement of the lever in still another direction.

Another object of my invention is to also embody in the actuating system referred to a foot-operated control valve which may be operated at any time to actuate all the brakes with any desired braking pressure.

Still another object of my invention is to provide in a fluid pressure braking system, improved valve means for selectively controlling the brakes on opposite sides of a vehicle and in which only a single metering valve is employed for controlling the braking pressures.

Yet another object of my invention is to provide a single lever-operated valve mechanism for a fluid pressure actuated vehicle braking system which will permit certain brakes to be selectively applied or to be simultaneously applied and maintained in such condition without manual effort.

Figure 1:
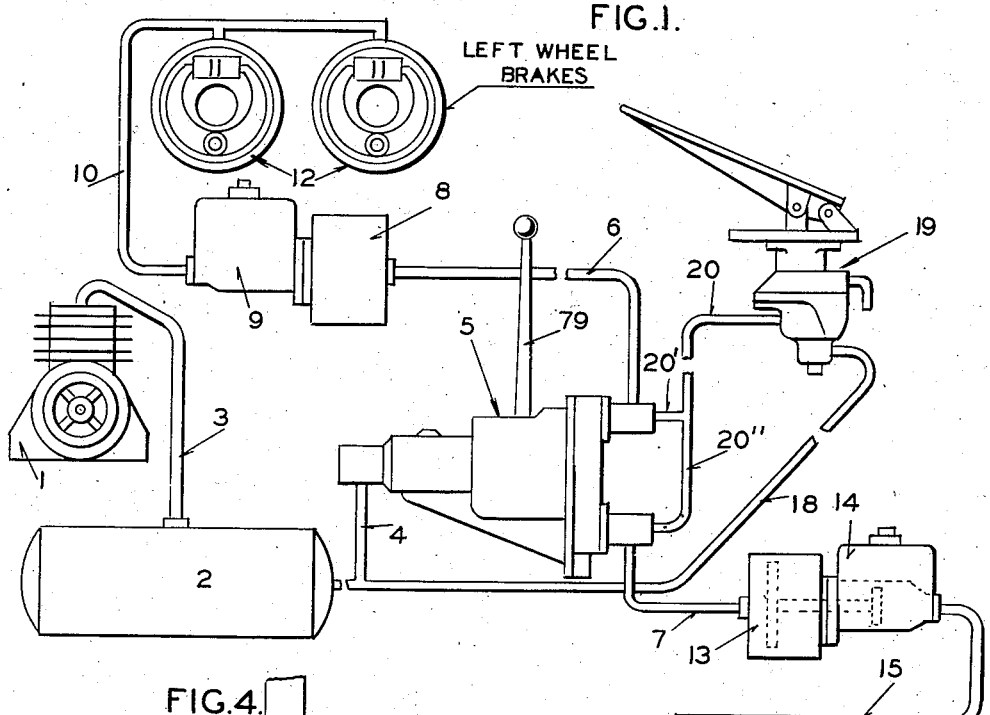

Other objects of my invention will become apparent from the following description taken in connection with the accompanying drawings in which Figure 1 is a schematic view of the fluid pressure actuating system designed for controlling the brakes of a vehicle and embodying my invention; Figure 2 is an enlarged longitudinal sectional view of my novel hand-controlled valve mechanism whereby certain brakes can be selectively operated or all the brakes simultaneously operated by predetermined movements of the valve controlling lever; Figure 3 is a sectional view taken on the line 3—3 of Figure 2; and Figure 4 is a sectional view taken on the line 4—4 of Figure 3.

Referring first to Figure 1, there is shown a fluid pressure actuating system designed primarily for controlling the brakes of a vehicle and enabling the operator to so operate the brakes that they can be employed to aid in steering, although it is to be understood that the same system may be employed for actuating other devices besides brakes if found desirable. Numeral 1 indicates an air compressor which is connected to a reservoir or storage tank 2 by a conduit 3 in order that compressed air may be stored for use in operating the brakes. A conduit 4 connects the tank with a hand-operated valve mechanism generally indicated by the numeral 5, which valve means is capable of so controlling the fluid pressure from the tank that it can selectively flow to conduits 6 and 7 leading from the valve means. The conduit 6 leads to a power cylinder 8 for actuating a hydraulic master cylinder 9 having its outlet connected by a conduit 10 with the fluid motors 11 of brake assemblies 12 on the left-hand wheels of the vehicle. The conduit 7 leads to a power cylinder 13 which actuates a master cylinder 14 connected by a conduit 15 to the fluid motors 16 for operating the brake assemblies 17 on the right-hand wheels of the vehicle. There is also provided a conduit 18 which leads from the air tank to a foot-operated control valve 19 which has its outlet connected to the valve mechanism 5 by a conduit 20 and branch conduits 20' and 20''. By means of the foot-operated control valve, both power cylinders 8 and 13 may be operated together to simultaneously apply the brake assemblies 12 and 17. The manner in which conduit 20 communicates with conduits 6 and 7 will become apparent when the details of the valve mechanism 5 are described.

Figure 4:
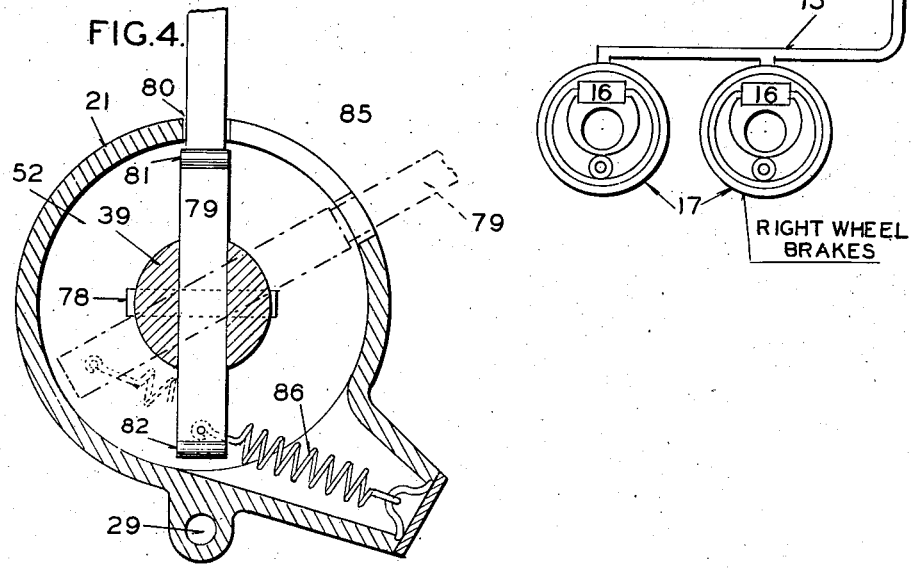

Referring now to Figures 2, 3, and 4, the valve mechanism 5 comprises two main casings 21 and 22 and two small casings 23 and 24 attached to the casing 22. The casing 21 is provided with two cylindrical bores 25 and 26 divided by a partition 27 and communicating with each other by a passage 28 in said partition. The bore 25 is in constant communication with conduit 4 leading from the storage tank 2 and the bore 26 is in constant communication with a passage 29 in the wall of casing 21, said passage leading toward casing 22. The passage 28 between the two bores is provided with a valve seat 30 and cooperating therewith is an inlet valve element 31 biased on the seat by a spring 32. Within bore 26 is a piston 33 having a passage 34 therethrough. The piston is formed with a valve seat 35 on the inner end of the passage and cooperating with this seat is a valve element 36, said valve element being connected to the inlet valve element 31 by the stem 37. A light spring 38 biases the piston 33 to a position where the valve element 36 will be in an unseated position, thus leaving the passage 34 open and in communication with the previously mentioned passage 29. The piston 33 is adapted to be actuated by a movable plunger 39 through an interposed spring 40 of considerably greater strength than spring 38. The bore 26 at the rear of piston 33 is provided with an outlet port 41 communicating with the atmosphere.

It is apparent that the structure just described is an ordinary metering control valve and when plunger 39 is moved forwardly, piston 33 is moved through spring 40 to cause the seating of valve element 36, thus preventing communication between the forward end of the bore and atmosphere. Continued movement of the plunger will result in the piston and valve element 36 moving together, thereby unseating valve element 31 and connecting the tank to passage 29. As pressure builds up and acts against piston 33, spring 40 will be compressed and the piston moved to cause the closing of the inlet valve element 31. When adidtional pressure is desired, the plunger may be moved forwardly again to unseat the valve element 31, the amount of the additional pressure being determined by the extent of compressing spring 40. When plunger 39 is released and permitted to return to its position shown in Figure 2, the valve element 36 will again be unseated and fluid pressure which has been admitted to passage 29 will be released to atmosphere.

The passage 29 coming from bore 26 communicates with a passage 42 in casing 22, said passage 42 being provided with two outlet openings 43 and 44 positioned on opposite sides of the common axis of bores 25 and 26 in the forward portion of casing 21. Adjacent the openings 43 and 44 are bores 45 and 46 in the end of casing 21 and mounted in these bores are pistons 47 and 48. The piston 47 carries at one end a valve element 49 which is adapted to cooperate with a valve seat 50 surrounding the opening 43 to thus close said opening. The piston 47 is formed with a stem 51 at its other end which projects into a chamber 52 formed in casing 21. At the stem end of the piston is a sealing ring 53 for engaging a seat 54 to seal the end of the piston when it is at the extreme left end of bore 45.

One end of piston 48 in bore 46 carries a valve element 55 for cooperation with a seat 56 at the end of opening 44 for closing said opening. The opposite end of the piston is provided with a stem 57 extending into chamber 52 and a sealing ring 58 on said stem end of the piston is adapted to engage a seat 59 for sealing the piston when it is at the extreme left end of bore 45.

A passage 60 in casing 22 is adapted to place opening 43 of passage 42 in communication with a cylinder 61 in casing 23 which cylinder has its central portion communicating with the previously referred to conduit 6 leading to the power cylinder 8 for operating the brakes of the left wheels. A passage 62 in casing 22 places opening 44 of passage 42 in communication with a cylinder 63 in casing 24. The central portion of this cylinder is in communication with the previously referred to conduit 7 leading to power cylinder 13 for operating the brakes of the right-hand wheels. The outer end of cylinder 61 communicates with the branch conduit 20' coming from the outlet of the foot-operated control valve. The outer end of cylinder 63 communicates with the branch conduit 20''.

In cylinder 61 is a piston 64 carrying on its opposite ends valve elements 65 and 66, valve element 65 cooperating with a valve seat 67 when the piston is at the left end of the cylinder, and valve element 66 cooperating with a valve seat 68 when the piston is at the right end of the cylinder.

In a like manner, cylinder 63 has reciprocable therein a piston 69, the opposite ends of which carry valve elements 70 and 71, valve element 70 cooperating with a seat 72 when the piston is at the left end of the cylinder, and valve element 71 cooperating with valve seat 73 when the piston is at the right end of the cylinder. It is thus seen that, by means of pistons 64 and 69, fluid under pressure will be permitted to flow from conduit 20 to conduits 6 and 7 when the pistons are at the left end of their cylinders and that fluid under pressure will be permitted to flow from passages 60 and 62 to conduits 6 and 7 when the pistons are at the right ends of their cylinders. The pistons will be automatically moved by fluid under pressure acting on their ends.

The plunger 39 for controlling the metering valve mechanism extends through chamber 52 and has its rear end journaled in a bore 74 in the rear end of casing 21 between pistons 47 and 48. The casing 22 carries a cylindrical projection 75 extending in bore 74. The projection 75 has a cam surface 76 for cooperation with a cam surface 77 on the end of plunger 39, said cam surfaces being so related that when the plunger is rotated, it will be forced to the left and actuate the metering valve mechanism. Plunger 39 has pivotally connected thereto, by a pivot pin 78, a lever 79 extending through a longitudinal slot 80 in casing 21. The lever projects beyond pivot pin 78 and on opposite sides of said pin it carries projections or knobs 81 and 82 for cooperation with an annular plate 83 surrounding plunger 39. This plate cooperates with stems 51 and 57 of the two previously mentioned pistons 47 and 48 so that the pistons can be operated by the lever through the plate. A spring-pressed member 84 is carried by plunger 39 and cooperates with the lever to hold it in a general vertical inoperative position. In addition to the longitudinally extending slot 80 in casing 21, there is provided a laterally extending slot 85 for permitting said lever to be moved laterally of slot 85 to rotate plunger 39 whereby the cam surfaces will cause the plunger to move to the left. The slot 85 is so formed that as the pivot of the lever moves forwardly when plunger 39 is rotated, the lever will also move forwardly and maintain its right angle relation to plunger 39. The lower end of the lever is connected by a light spring 86 to a portion of casing 21 to thus bias the lever to its vertical position in the longitudinal slot 80.

Referring now to the operation of the fluid pressure actuating system, it is apparent from the description that when lever 79 is moved to the left, as viewed in Figure 2, the lever will rotate on its pivot 78 and the lower end thereof will cause movement of piston 48 to the right to thus close opening 44. Continued movement of the lever to the left will now result in the lever fulcruming about knob 82 on the lower end thereof and causing plunger 39 to be moved to the left. This will cause the closing of the exhaust valve element 36 and the opening of the inlet valve 31, thereby admitting fluid under pressure into conduit 29 from where it is free to flow through passage 42, opening 43 and passages 60 and 6 to cause operation of the power cylinder 8 which will then operate the master cylinder device and apply the brakes on the left wheels or equivalent members of the vehicle. Thus by braking the wheels on the left side, steering of the vehicle to the left can be facilitated. If piston 64 in cylinder 61 is not in the right-hand end of said cylinder, it will be forced to such position by the air under pressure coming in through conduit 60.

If it should be desired to apply the brakes on the right wheels of the vehicle to asist steering to the right, lever 79 is moved to the right as viewed in Figure 2. This will result in piston 47 being moved to the right, thereby closing opening 43. Continued movement of the lever to the right will result in the lever fulcruming on knob 81 and plunger 39 moving to the left to thus admit air through the inlet valve element 31 to passage 42 and from there through opening 44, passage 62 and conduit 7 to the power cylinder 13, thereby actuating the master cylinder device 14 and applying the brakes on the right wheels of the vehicle.

If it should be desired to apply the brakes on all the wheels and maintain them applied, this can be accomplished by moving the lever laterally into slot 85. This will result in plunger 39 being rotated and a camming action taking place between the cam surfaces 76 and 77, thereby moving plunger 39 to the left and opening valve element 31 to admit fluid pressure to passages 29 and 42. Neither piston 47 nor 48 will be moved when the lever is moved into slot 85 since there is no pivotal movement of the lever on the plunger. With neither opening 43 nor 44 closed, fluid under pressure can enter both conduits 6 and 7 and operate both power cylinders to thus apply all the brakes. The lever 79 can be left in slot 88 due to the slot's formation and, therefore, it will not be necessary for the operator to hold his hand on the lever to maintain all the brakes applied.

If it should be desired to apply all the brakes by a foot pedal in the usual manner, this can be done by the operation of the foot-operated control valve 19 which is preferably a metering valve similar to the type operated by plunger 39. When this valve is operated, fluid under pressure will enter conduit 20 and branch conduits 20' and 20'' and act on the two pistons 64 and 69 and move them to the left. This will place conduit 20' in communication with conduit 6 and conduit 20'' in communication with conduit 7 and permit fluid under pressure to simultaneously operate the two power cylinders and all the brakes. The amount of fluid pressure can be controlled by the extent of operation of the pedal. When pistons 64 and 69 are at the left, fluid under pressure in cylinders 61 and 63 cannot enter passages 60 and 62 and thus escape to atmosphere through passages 42 and 29 and the open exhaust valve element 36.

Being aware of the possibility of modifications in the particular structure herein described without departing from the fundamental principles of my invention, I do not intend that its scope be limited except as set forth by the appended claims.

Having fully described my invention, what I claim as new and desire to secure by Letters Patent of the United States is:

1. In a fluid pressure system, two devices to be actuated, a source of fluid pressure, conduit means between the source and the devices, and means comprising a single metering valve and two shut-off valves controlled by a single lever for permitting fluid under pressure from the source to be selectively placed in communication with the devices to be actuated, said lever being so mounted that when moved in one direction it will close a shut-off valve and then fulcrum thereon and subsequently open the metering valve and when moved in another direction will close the other shut-off valve and then fulcrum thereon and subsequently open the metering valve.

2. In a fluid pressure system, two devices to be actuated, a source of fluid pressure, conduit means between the source and the devices, and means comprising a single metering valve and two shut-off valves controlled by an operator-operated single lever for permitting fluid under pressure from the source to be selectively placed in communication with the devices to be actuated or to be simultaneously placed in communication with said devices, said lever being so mounted that each selective control and the simultaneous control requires the operator-operated end of the lever to be moved in different directions from a predetermined inoperative position.

3. In a fluid pressure system, two fluid motors to be actuated, a source of fluid pressure, conduit means between the source and the motors, valve means and two shut-off valves for selectively controlling the flow of fluid under pressure from the source to the motors, and a single lever for operating the valve means and the two shut-off valves, said lever being so pivotally mounted and associated with said valve means and the shut-off valves that when moved in one direction in a single plane from a predetermined position one shut-off valve will be closed and the valve means will be subsequently opened and when moved in another direction in a single plane from said predetermined position the other shut-off valve will be closed and the valve means subsequently opened.

4. In a fluid pressure system, two devices to be actuated, a source of fluid pressure, conduit means between the source and the devices, means comprising a single inlet valve and two shut-off valves controlled by a single lever for permitting fluid under pressure from the source to be selectively placed in communication with the devices to be actuated or to be simultaneously placed in communication with said devices, and means comprising a second single valve for placing both devices in communication with the source independently of the first named single valve and without predetermined conditioning of the shut-off valves.

5. In a fluid pressure system, two devices to be actuated, a source of fluid pressure, a conduit communicating with each device, a conduit communicating with the source of pressure, valve means comprising a single valve element for controlling the flow of fluid from the source through said last named conduit to the first two named conduits, a shut-off valve associated with each of the first two named conduits, a single lever movable in a single plane for controlling the valve means and the two shut-off valves, and means operable when said lever is moved in the plane in one direction from a central position causing the closing of one shut-off valve and the subsequent operation of the valve means and when moved in the plane in the opposite direction causing the closing of the other shut-off valve and the subsequent operation of the valve means.

6. In a fluid pressure system, two devices to be actuated, a source of fluid pressure, a conduit communicating with each device, a conduit communicating with the source of pressure, valve means comprising a single valve element for controlling the flow of fluid from the source through said last named conduit to the first two named conduits, a shut-off valve associated with each of the first two named conduits, a single lever for controlling the valve means and the two shut-off valves, means operable when said lever is moved in one direction from a central position causing the closing of one shut-off valve and the operation of the valve means and when moved in the opposite direction causing the closing of the other shut-off valve and the operation of the valve means, and means for causing the operation of the valve means only when the lever is moved in a third direction to thereby actuate both devices simultaneously.

7. In a fluid pressure system, two devices to be actuated, a source of fluid pressure, a conduit communicating with each device, a conduit communicating with the source of pressure, valve means for controlling the flow of fluid from the source through said last named conduit to the first two named conduits, a shut-off valve associated with each of the first two named conduits, a single lever for controlling the valve means and the two shut-off valves, means operable when said lever is moved in one direction from a central position causing the closing of one shut-off valve and the operation of the valve means and when moved in the opposite direction causing the closing of the other shut-off valve and the operation of the valve means, a foot-controlled valve, and means for placing the source in communication with both actuated devices through at least a portion of the conduits connected thereto when the foot-controlled valve is operated.

8. In a fluid pressure system, two devices to be actuated, a source of fluid pressure, conduit means between the source and the devices, an inlet valve having a movable element and associated with the conduit means for controlling the flow of fluid from the source to the devices, a reciprocable member for operating the valve element, a lever pivoted on said member intermediate its ends, a shut-off valve for preventing flow of fluid under pressure after passing the inlet valve to one device, and a shut-off valve for preventing flow of fluid under pressure after passing the inlet valve to the other device, said shut-off valves being positioned on opposite sides of the pivot of the lever and so associated with the lever that when the lever is moved in one direction said lever will close one shut-off valve and then open the inlet valve by movement of the member upon which it is pivoted and movement in the opposite direction will close the other shut-off valve and then open the inlet valve by a movement of the member upon which it is pivoted.

9. In a fluid pressure system, two devices to be actuated, a source of fluid pressure, conduit means between the source and the devices, an inlet valve associated with the conduit means for controlling the flow of fluid from the source to the devices, a shut-off valve for preventing flow of fluid under pressure to one device after passing the inlet valve, a shut-off valve preventing flow of fluid under pressure to the other device after passing the inlet valve, a single lever for operating the inlet valve and the shut-off valves, said lever being pivotally mounted and so associated with all the valves that a movement in one direction from a predetermined position will close one of the shut-off valves and open the inlet valve and a movement in the opposite direction from the predetermined position will close the other shut-off valve and open the inlet valve, and cam means operable by the lever when moved in a lateral direction with respect to its said other directions for opening the inlet valve.

10. In a fluid pressure system, two devices to be actuated, a source of fluid pressure, conduit means between the source and the devices, an inlet valve having a movable element and associated with the conduit means for controlling the flow of fluid from the source to the devices, a combined reciprocable and rotatable member for operating the valve element, a lever pivoted on said member intermediate its ends, a shut-off valve for preventing flow of fluid under pressure to one device after passing the inlet valve, a shut-off-valve for preventing flow of fluid under pressure to the other device after passing the inlet valve, said shut-off valves being positioned on opposite sides of the pivot of the lever and so associated with the lever that when the lever is moved in one direction said lever will close one shut-off valve and then open the inlet valve by movement of the member upon which it is pivoted and movement in the opposite direction will close the other shut-off valve and then open the inlet valve by a movement of the member upon which it is pivoted, and cam means operable by a lateral movement of said lever and rotation of said member for moving said member axially to open said inlet valve without closing either of the shut-off valves.

11. In a fluid pressure system, two devices to be actuated, a source of fluid pressure, conduit means between the source and the devices, an inlet valve associated with the conduit means for controlling the flow of fluid from the source to the devices, a shut-off valve for preventing flow of fluid under pressure to one device after passing the inlet valve, a shut-off valve for preventing flow of fluid under pressure to the other device after passing the inlet valve, and a single lever for operating the inlet valve and the shut-off valves, said lever having a movable pivot associated with the movable element of the inlet valve and being so operatively connected with the shut-off valves that a pivotal movement in one direction on its pivot from a predetermined position will close one of the shut-off valves and permit the lever to fulcrum at a point other than its pivot to cause the opening of the inlet valve and a movement in the opposite direction on its pivot from the predetermined position will close the other shut-off valve and permit the lever to fulcrum at another point and cause the opening of the inlet valve.

12. In a fluid pressure system, two devices to be actuated, a source of fluid pressure, a conduit communicating with each device, two independently operated control valves connected to the conduits and each capable of controlling the flow of fluid from the source to both conduits when individually operated, and two automatically operated shut-off valves each associated with a conduit for preventing fluid pressure which enters the conduits through either control valve from communicating with the other control valve.

13. In a fluid pressure system, two devices to be actuated, a source of fluid pressure, a conduit communicating with each device, two independently operated control valves connected to the conduits and controlling the flow of fluid from the source thereto, and two automatically operated shut-off valves for preventing fluid pressure which enters the conduits through either control valve from communicating with the other control valve, one of said control valve means comprising a single inlet valve, two valves each of which prevents fluid under pressure which passes said inlet valve from entering a conduit and a single control lever for selectively operating either of said last named valves and the inlet valve.

14. In a fluid pressure system, two devices to be actuated, a source of fluid pressure, means comprising a single inlet control valve and two shut-off valves all controlled by a single lever for permitting fluid under pressure from the source to be selectively placed in communication with the two devices to be actuated, an independently controlled valve connected to place the source in communication with the two devices, and means comprising two automatically operated shut-off valves for preventing the flow of fluid under pressure from one control valve to the other when either is operated independently of the other.

15. In a fluid pressure system, two devices to be actuated, a source of fluid pressure, means comprising valve means for controlling communication between the source and the two devices, a normally open shut-off valve associated with each device for preventing fluid pressure from communicating therewith after passing the valve means, a hand lever so associated with the valve means and the shut-off valves that when it is moved in one direction from a predetermined position it will close one shut-off valve and open the valve means and when moved in another direction from a predetermined position it will close the other shut-off valve and open the valve means, foot-controlled valve means for placing the source in communication with both devices, and means for automatically preventing fluid pressure caused to be effective in the devices when the foot-controlled valve means is operated from communicating with the hand lever controlled valve means.

16. In a fluid pressure system, two devices to be actuated, a source of fluid pressure, means comprising valve means for controlling communication between the source and the two devices, a normally open shut-off valve associated with each device for preventing fluid pressure from communicating therewith after passing the valve means, a hand lever so associated with the valve means and the shut-off valves that when it is moved in one direction from a predetermined position it will close one shut-off valve and open the valve means and when moved in another direction from a predetermined position it will close the other shut-off valve and open the valve means, means for opening the valve means without closing either shut-off valve when the lever is moved in a third direction, foot-controlled valve means for placing the source in communication with both devices, and means for automatically preventing fluid pressure caused to be effective in the devices when the foot-controlled valve means is operated from communicating with the hand lever controlled valve means.

17. In a fluid pressure system, two devices to be actuated, a source of fluid pressure, a conduit communicating with each device, a conduit communicating with the source of pressure, valve means for controlling the flow of fluid from the source through said last named conduit to the first two named conduits, a shut-off valve associated with each of the first two named conduits, a single lever for controlling the valve means and the two shut-off valves, means operable when said lever is moved in one direction from a central position causing the closing of one shut-off valve and the operation of the valve means and when moved in the opposite direction causing the closing of the other shut-off valve and the operation of the valve means, by-pass conduit means around the valve means and shut-off valves, a foot-controlled valve for controlling flow of fluid from the source through the by-pass conduit means, and automatically operated valves for preventing fluid pressure passing through the by-pass conduit means from communicating with the lever-controlled valve means.

18. In a fluid pressure system, two fluid motors, a conduit leading to each fluid motor, a source of pressure, conduit means connecting the source to each fluid motor conduit, a control valve for controlling flow of fluid through the conduit means, other conduit means connecting the source to each fluid motor conduit, a control valve for controlling flow of fluid through said other conduit means, and an automatically-operated shut-off valve so associated with each fluid motor conduit and the conduit means that when fluid under pressure flows from the source thereto by way of either control valve, the fluid under pressure is prevented from flowing to the other control valve.

WERNER F. BOLDT.